United States Patent
Tan et al.

(10) Patent No.: US 12,543,239 B2
(45) Date of Patent: Feb. 3, 2026

(54) SIGNAL RECEPTION METHOD, AND APPARATUS FOR UE IN IDLE-STATE, STORAGE MEDIUM, AND TERMINAL

(71) Applicant: UNISOC (CHONGQING) TECHNOLOGIES CO., LTD., Chongqing (CN)

(72) Inventors: Shu Tan, Shanghai (CN); Wei Guan, Shanghai (CN); Miao Xian, Shanghai (CN)

(73) Assignee: UNISOC (CHONGQING) TECHNOLOGIES CO., LTD., Chongqing (CN)

( * ) Notice: Subject to any disclaimer, the term of this patent is extended or adjusted under 35 U.S.C. 154(b) by 862 days.

(21) Appl. No.: 17/789,702

(22) PCT Filed: Apr. 30, 2020

(86) PCT No.: PCT/CN2020/088008
§ 371 (c)(1),
(2) Date: Jun. 28, 2022

(87) PCT Pub. No.: WO2021/135008
PCT Pub. Date: Jul. 8, 2021

(65) Prior Publication Data
US 2023/0042276 A1 Feb. 9, 2023

(30) Foreign Application Priority Data
Dec. 30, 2019 (CN) .......................... 201911402023.4

(51) Int. Cl.
*H04W 76/27* (2018.01)
*H04W 24/02* (2009.01)

(52) U.S. Cl.
CPC ........... *H04W 76/27* (2018.02); *H04W 24/02* (2013.01)

(58) Field of Classification Search
CPC .............................. H04W 76/27; H04W 24/02
See application file for complete search history.

(56) References Cited

U.S. PATENT DOCUMENTS

| 10,292,077 | B2 | 5/2019 | Basu Mallick et al. |
| 10,499,296 | B2 | 12/2019 | Basu Mallick et al. |
| 10,506,478 | B2 | 12/2019 | Martin |
| 10,555,323 | B2 | 2/2020 | Ma et al. |

(Continued)

FOREIGN PATENT DOCUMENTS

| CN | 106171013 A | 11/2016 |
| CN | 106455062 A | 2/2017 |

(Continued)

OTHER PUBLICATIONS

Extended European Search Report regarding Patent Application No. 20909113.1, dated May 8, 2023.

(Continued)

*Primary Examiner* — Siming Liu
(74) *Attorney, Agent, or Firm* — Harness, Dickey & Pierce, P.L.C.

(57) ABSTRACT

Signal reception method and apparatus for a UE in an idle-state, storage medium, and a terminal. The method includes: monitoring signal quality of a serving cell; and determining and receiving system information matching the signal quality based on the signal quality.

19 Claims, 2 Drawing Sheets the UE monitors signal quality of a serving cell — S101 the UE determines and receives system information matching the signal quality based on the signal quality — S102

(56) References Cited

U.S. PATENT DOCUMENTS

| | | |
|---|---|---|
| 10,721,662 B2 | 7/2020 | Basu Mallick et al. |
| 11,224,071 B2 | 1/2022 | Peisa et al. |
| 11,246,145 B2 | 2/2022 | Ma et al. |
| 11,356,914 B2 | 6/2022 | Basu Mallick et al. |
| 2016/0212663 A1 | 7/2016 | Uemura et al. |
| 2016/0337931 A1 | 11/2016 | Wang et al. |
| 2017/0105166 A1 | 4/2017 | Lee et al. |
| 2017/0135005 A1 | 5/2017 | Basu Mallick et al. |
| 2017/0257874 A1 | 9/2017 | Ma et al. |
| 2018/0097541 A1 | 4/2018 | Bhattad et al. |
| 2018/0249383 A1* | 8/2018 | Martin .............. H04W 36/0061 |
| 2018/0324654 A1 | 11/2018 | Chincou et al. |
| 2019/0045429 A1 | 2/2019 | Koskinen et al. |
| 2019/0098564 A1 | 3/2019 | Gupta et al. |
| 2019/0215744 A1 | 7/2019 | Basu Mallick et al. |
| 2019/0261421 A1 | 8/2019 | Peisa et al. |
| 2020/0068464 A1 | 2/2020 | Basu Mallick et al. |
| 2020/0163093 A1 | 5/2020 | Ma et al. |
| 2020/0305040 A1 | 9/2020 | Basu Mallick et al. |

FOREIGN PATENT DOCUMENTS

| | | |
|---|---|---|
| CN | 107030340 A | 8/2017 |
| CN | 107040340 A | 8/2017 |
| CN | 107431962 A | 12/2017 |
| CN | 109756953 A | 5/2019 |
| CN | 109792317 A | 5/2019 |
| CN | 110178439 A | 8/2019 |
| WO | 2015143244 A1 | 9/2015 |

OTHER PUBLICATIONS

NTT Docomo Inc: CE Mode Threshold Adjustments for non-BL and BL UErr, 3GPP Draft; R2-1914474, 3rd Generation Partnership Project (3GPP), Mobile Competence Centre ; 650, Route Des Lucioles ; F-06921 Sophia-Antipolis Cedex France vol. RAN WG2, No. Reno, Nevada, United States; Nov. 18, 2019-Nov. 22, 2019 Nov. 8, 2019 (Nov. 8, 2019), XP051816554, Retrieved from the Internet: URL:https://ftp.3gpp.org/tsg ran/WG2 RL2/T SGR2_108/ Docs/R2-1914474.zip R2-1914474 CE Mode Adjustments Discussion.

First Chinese Office Action regarding Application No. 2019114020234 dated Nov. 20, 2020. English translation provided by Unitalen Attorneys at Law.

Sony, "3GPP TSG-RAN WG2 Meeting #90 R2-152435", Cell Selection and Reselection for Enhanced Coverage.

Sony "3GPP TSG-RAN WG2 Meeting #92 R2-156557", Open Issues on Cell Reselection for Enhanced Coverage.

Intel Corporation, "Non-BL UE in Normal and Enhanced Coverage", 3GPP TSG RAN WG2 Meeting #108 R2-191486, Nov. 8, 2019 (Nov. 8, 2019), pp. 1-5.

International Search Report (English and Chinese) and Written Opinion of the International Searching Authority (Chinese) issued in PCT/CN2020/088008, mailed Sep. 14, 2020; ISA/CN.

* cited by examiner

SIGNAL RECEPTION METHOD, AND APPARATUS FOR UE IN IDLE-STATE, STORAGE MEDIUM, AND TERMINAL

CROSS-REFERENCE TO RELATED APPLICATIONS

This application is a National Stage of International Application No. PCT/CN2020/088008, filed on Apr. 30, 2020, which claims priority to Chinese Patent Application No. 201911402023.4, filed on Dec. 30, 2019. The entire disclosures of the above applications are expressly incorporated by reference herein.

TECHNICAL FIELD

The present disclosure generally relates to radio communication technology field, and more particularly, to a signal reception method and apparatus for a User Equipment (UE) in an idle-state, a storage medium, and a terminal.

BACKGROUND

Currently, in evolution of network deployment of operators, it is expected to reduce network operation and maintenance cost by minimizing a number of Radio Access Technologies (RATs) that the operators maintain. Facing Internet of Things (IoT) demand boom, due to a good coverage of 2G network and low power consumption and low cost properties of IoT demand of 2G network, terminal manufacturers have insufficient driving force to provide IoT products based on conventional 4G technology. As more and more 2G IoT products come to practical applications, reliance on 2G network has increased, causing the operators to have to maintain more RATs, and to be unable to ensure a full usage of their own spectrum.

In view of this, the 3rd Generation Partnership Project (3GPP) officially introduced Machine-type Communication (MTC) technology from Long-Term Evolution (LTE) Release 12 (R12), so as to provide similar power consumption/cost as 2G networks with higher spectrum utilization to meet the needs of IoT.

3GPP MTC technology has evolved through two generations of 3GPP R12 MTC and R13 enhanced MTC (eMTC), and is significantly close to 2G in terminal and significantly better than 2G and 4G in coverage (R13 eMTC has achieved coverage enhancement capability of conventional LTE frequency division duplex mode of 15 dB) and power consumption by introducing key technologies such as 1.4 MHz bandwidth reduced low complexity, coverage enhancement (CE, also known as enhanced coverage) or Power Saving Mode (PSM). However, it is unavoidable that peak rate (R13 eMTC downlink/uplink (DL/UL) is 800 kbps and 1 Mbps, respectively) and low delay index have significantly deteriorated compared with 4G.

Based on market tests, 3GPP R13 eMTC technology is basically sufficient for simple application scenarios such as sensors, meters and e-books. However, in application scenarios such as voice wearables and telemedicine, the peak rate of R13 eMTC of 1 Mbps is quite difficult to support.

Therefore, in 3GPP R14 further eMTC (feMTC), a new capability category Cat.M2 was introduced, and original R13 Cat.M1 DL/UL 800 kbps/1 Mbps was improved to maximum theoretical throughput of R14Cat.M2 DL/UL 4 Mbps/7 Mbps by relaxing a working bandwidth to 5 MHz. In addition, R14 feMTC introduced non-bandwidth reduced low complexity (Non-BL) specification that supports CE, i.e., adding CE capability to terminal capability categories of Cat.0 and higher, making a peak rate of MTC technology family exactly the same as that of conventional LTE terminals, and a coverage gain up to 15 dB, thereby significantly broadening a coverage of 4G cells (actual deployment demonstration data shows that a cell coverage area is increased by a typical value of 87% based on CE mode A) and reducing cost of 4G network deployment.

SUMMARY

Embodiments of the present disclosure may optimize a signaling reception process for terminals to save power consumption and improve user experience.

In an embodiment of the present disclosure, a signal reception method for a UE in an idle-state is provided, including: monitoring signal quality of a serving cell; and determining and receiving system information matching the signal quality based on the signal quality.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

Figure 1:
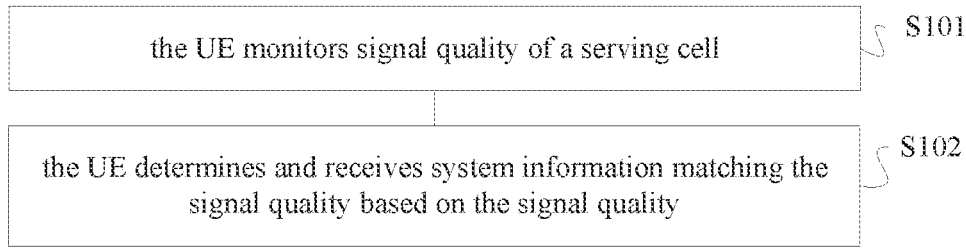
FIG. 1 is a flow chart of a signal reception method for a UE in an idle-state according to an embodiment.

As described in the background, in existing techniques, a Non-BL UE in a regular coverage mode may enter a regular coverage blind area due to mobility, which reduces user experience.

In 3GPP TS36.300, UE categories include category M1 (i.e., Cat-M1) UE, category M2 (Cat-M2) UE and Non-BL UE, Non-BL UE is category 0 or higher category. The CE mode includes mode A (CE mode A) and mode B (CE mode B). Maximum working bandwidth of various UE services is shown in Table 1.

TABLE 1

|  | Mode A | Mode B |
|---|---|---|
| Cat-M1 | 6/6 | 6/6 |
| Cat-M2 | 24/24 | 24/6 |
| Non-BL | 96 (or 24)/24 | 96 (or 24)/6 |

Unfortunately, as 3GPP R14 neglected to configure a downlink 64 QAM modulation mode for Non-BL UEs, a Physical Downlink Shared Channel (PDSCH) of Non-BL UEs of R14 has a maximum modulation mode of 16 QAM with relatively low spectrum efficiency. If this kind of Non-BL UEs obtain a high enough data throughput, network capacity may be seriously affected, which is catastrophic for network spectrum resources. The problem of low spectrum efficiency was not fundamentally resolved until support of a downlink 64 QAM modulation method was introduced in Even further enhanced MTC (efeMTC) of 3GPP R15.

3GPP TS36.300 provides following stipulations on network camping and IDLE behavior of Non-BL UEs. A cell that allows the UEs to access using the enhanced coverage mechanism must be adapted to "System Information Block type1-Bandwidth Reduced" (SIB1-BR). A process of reading system information for Non-BL UEs in the enhanced coverage mode is the same as that for Cat-M1/Cat-M2 UEs. In the regular coverage mode, Non-BL UEs can choose to read regular system information for network camping and subsequent procedures.

In the enhanced coverage mode, a paging monitoring mechanism of the Non-BL UEs is the same as that of Cat-M1/Cat-M2 UEs, and configuration details of paging occasions are not transferred by a specific coverage category of the UE.

When initiating a request for paging a Non-BL UE to an access network, a core network needs to carry information about an enhanced coverage category and a corresponding cell identifier. If the paging request lacks necessary information (such as wireless access capability of the UE), a base station may choose to start a call at the same time in a conventional Long Term Evolution (LTE) terminal paging occasion and in an enhanced coverage terminal paging occasion, so as to avoid calling omission.

In an idle state, the Non-BL UE does not need to notify the network when the enhanced coverage category changes.

3GPP TS36.321 stipulates that Non-BL UEs follows the S criterion to determine the enhanced coverage category for camping on. When in the enhanced coverage mode, the Non-BL UEs shall return to a regular coverage mode by reselection as much as possible.

According to 3GPP TS 36.304, the S criterion in the regular coverage mode is defined as following.

Srxlev>0 and Squal>0;

Srxlev=$Q_{rxlevmeas}$−($Q_{rxlevmin}$+$Q_{rxlevminoffset}$)−Pcompensation−$Qoffset_{temp}$, Squal=$Qq_{ualmeas}$−($Q_{qualmin}$+$Q_{qualminoffset}$)−$QOffset_{temp}$, Srxlev represents a cell selection RX level value in dB, $Q_{rxlevmeas}$ represents a measured cell RX level value, i.e., RSRP, $Q_{rxlevmin}$ represents a minimum required RX level in the cell in dBm, $Q_{rxlevminoffset}$ represents an offset (details can be referred to 3GPP TS23.122), Pcompensation represents a compensation amount (details can be referred to 3GPP TS36.331 and TS36.101), and Qoffsettemp represents an offset amount (details can be referred to 3GPP TS36.331).

Squat represents a cell selection quality value in dB, $Q_{qualmeas}$ represents a measured cell quality factor, i.e., RSRQ, $Q_{qualmin}$ represents a minimum required quality level in the cell in dB, $Q_{qualminoffset}$ represents an offset (details can be referred to 3GPPTS23.122).

Those skilled in the art could understand that $Q_{rxlevmin}$ and $Q_{qualmin}$ are derived from conventional SIB1. For the CE mode A, the parameters $Q_{rxlevmin}$ and $Q_{qualmin}$ are replaced by $Q_{rxlevminCE}$ and $Q_{qualminCE}$ respectively to check whether the S criterion is met. Similarly, for the CE mode B, $Q_{rxlevmin}$ and $Q_{qualmin}$ are replaced by parameters $Q_{rxlevminCE1}$ and $Q_{qualminCE1}$ respectively to check whether the S criterion is met. Corresponding parameters $Q_{rxlevminCE}/Q_{rxlevminCE1}$ and $Q_{qualminCE}/Q_{qualminCE1}$ all come from SIB1-BR.

Similarly, relevant information of same-frequency neighbors for cell reselection is stored in SIB3 or SIB3 scheduled by SIB1-BR), and relevant information of different-frequency neighbors is stored in SIB5 or SIB5 scheduled by SIB1-BR.

Based on the above analysis, when a Non-BL UE is in regular coverage, merely the S criterion of regular coverage can be evaluated through SIB1. Once the Non-BL UE enters a regular coverage blind area due to mobility and does not meet the regular coverage relevant criteria, the Non-BL UE may merely initiate a service cell unavailability procedure to retry an enhanced coverage mode of the cell to camp on a network or enter a blind search procedure. A lost coverage state for a certain time period inevitably interferes with user experience. In addition, as the Non-BL UE in the regular coverage mode cannot deduce a relevant criteria of same-frequency/inter-frequency neighbor cells, when the regular coverage blind area cannot realize re-selection of better regular coverage cells, the Non-BL UE may miss an occasion of reselection of enhanced coverage target cells by the regular coverage serving cells.

In view of the above problems, the existing techniques proposed that even in conventional coverage scenarios, Non-BL UEs should read SIB1-BR and its scheduled SIB3 and SIB5 by default, and obtain an S criterion decision basis for CE mode A and CE mode B in advance. However, 4G network deployment does not always have conventional coverage blind spots or the UE does not necessarily enter the conventional coverage blind spots. The default reading of SIB1-BR and its scheduled SIB3 and SIB5 results in a waste of power consumption. In addition, as SIB1-BR and its scheduled SIB3 and SIB5 provide coverage services to cells, they are usually configured with higher repetition and longer scheduling periods, which means that power consumption of collecting all required SIB is quite wasteful.

As the SIB1-BR and its supporting SIB contain all the information required for reselection, the existing techniques also proposed that the Non-BL UE works in the enhanced coverage mode by default in an idle state. In principle, the corresponding design does not conform to Non-BL design guidelines, but it does not violate standards, as a selection of enhanced coverage category is unilaterally confirmed by the UE, which is free. However, paging in the enhanced coverage mode serves UEs that are actually under enhanced coverage, thus, physical channels related to paging are configured repeatedly. To collect all the required paging information, the Non-BL UE that only needs to work in the regular coverage mode is forced to work in the enhanced coverage mode and needs to pay longer working time in the idle state, which increases power consumption. Besides, all BL UEs are concentrated in the enhanced coverage mode, which may seriously reduce paging capacity and affect user experience of the entire network. Besides, the Non-BL UEs that only need to work in the regular coverage mode are forced to work in the enhanced coverage mode and enter a connected state, which immediately trigger an intra-cell handover from the enhanced coverage mode to the regular coverage mode, thereby increasing extra signaling consumption and affecting service continuity.

In embodiments of the present disclosure, a signal reception method for a UE in an idle-state is provided, including: monitoring signal quality of a serving cell; and determining and receiving system information matching the signal quality based on the signal quality.

With the embodiments of the present disclosure, a UE in an idle state supporting enhanced coverage may receive different system information on demand based on signal quality. Specifically, different from the existing techniques, in the embodiments of the present disclosure, pre-reading of different system information is triggered on demand by monitoring the signal quality of the cell where the UE is currently located in real time, thus complete system information required by reselection is received based on necessary power consumption cost merely at necessary time, which improves mobility experience of users to which the UE in the idle state belongs.

In order to clarify the objects, characteristics and advantages of the disclosure, embodiments of present disclosure will be described in detail in conjunction with accompanying drawings.

FIG. 1 is a flow chart of a signal reception method for a UE in an idle-state according to an embodiment. The method may be performed by a UE and includes S101 and S102.

In S101, the UE monitors signal quality of a serving cell.

In S102, the UE determines and receives system information matching the signal quality based on the signal quality.

In some embodiments, the UE may determine whether the serving cell supports an enhanced coverage mode, so that the UE may receive system information on demand based on the serving cell supporting the enhanced coverage mode.

In S101, the UE supporting enhanced coverage may monitor signal quality of the serving cell according to an idle state workflow of the UE in the idle state. The UE may receive MIB and determine whether a field schedulingInfo-SIB1-BR-r13 in the MIB are not all zero. If the field schedulingInfoSIB1-BR-r13 is not all 0, it indicates that a network camped on currently supports CE.

In some embodiments, the signal quality of the serving cell is represented by a serving cell measurement parameter which includes at least one selected from a group consisting of Reference Signal Received Power (RSRP), Reference Signal Received Quality (RSRQ), reference signal SINR (RS-SINR), and Received Signal Strength Indicator (RSSI).

In some embodiments, the coverage mode adopted by the UE may vary. Coverage categories selected by the UEs camping on the cell are different, and system information to be received is also different. Before the UE transitions from the regular coverage mode to the enhanced coverage mode, the UE needs to obtain system information of the enhanced coverage mode to obtain relevant system information. On the contrary, before the UE transitions from the enhanced coverage mode to the regular coverage mode, the UE needs to obtain system information of the regular coverage mode to obtain relevant system information. If the UE needs to change the coverage mode, the UE needs to receive system information relevant with the coverage mode, and then has an opportunity to adopt the corresponding coverage mode.

In S102, based on the signal quality satisfying the mode transition trigger preparation condition, the UE may receive system information corresponding to different coverage categories as needed. Said receiving system information corresponding to different coverage categories on demand refers to determining system information of the coverage category corresponding to the demand based on the demand, and receiving the system information. Specifically, the UE determines a candidate coverage category suitable for the UE based on the signal quality, determines system information corresponding to the candidate coverage category, and receive the system information. The system information is system information to be received that is determined based on the coverage category.

Specifically, the UE may determine whether the signal quality satisfies a specific mode transition trigger preparation condition according to the signal quality of the serving cell. Based on the signal quality satisfying the mode transition trigger preparation condition, the UE may determine a candidate coverage category that satisfies the mode transition trigger preparation condition and system information corresponding to the candidate coverage category. Afterward, the UE may receive the system information corresponding to the candidate coverage category.

For example, if the signal quality is higher than the mode transition trigger preparation condition, the UE does not need to change the coverage mode, and does not need to receive system information corresponding to other coverage categories. If the signal quality is lower than or equal to the mode transition trigger preparation condition, the UE may determine a candidate coverage category and system information corresponding to the candidate coverage category, and may receive the system information corresponding to the candidate coverage category.

In some embodiments, there may be multiple candidate coverage categories, and multiple mode transition trigger preparation conditions, and the mode transition trigger preparation conditions and the candidate coverage categories may be in one-to-one correspondence. Currently, the UE may support two coverage modes including the regular coverage mode and the enhanced coverage mode. In this case, when the signal quality of the serving cell to which the UE belongs meets the mode transition trigger preparation condition, the UE may ignore the candidate coverage category, and directly determine that it supports either the regular coverage mode or the enhanced coverage mode.

In some embodiments, as the current UE is either in the regular coverage mode or the enhanced coverage mode, when the signal quality monitored by the UE satisfies the mode transition trigger preparation condition, the UE can know that the candidate coverage mode is the regular coverage mode or the enhanced coverage mode. In addition, the UE has known the system information required by the regular coverage mode and the system information required by the enhanced coverage mode, thus, the UE can quickly determine the system information that needs to be received.

In some embodiments, if the signal quality of the serving cell satisfies the mode transition trigger preparation condition, the UE may receive the system information to be received after performing paging monitoring and measurement. Specifically, regardless of whether the UE is in the regular coverage mode or the enhanced coverage mode, based on the signal quality of the serving cell satisfies the mode transition trigger preparation condition, the UE may receive the system information that needs to be received after performing paging monitoring and measurement.

In some embodiments, when receiving the system information that needs to be received, the UE may temporarily stop determining whether the signal quality of the serving cell satisfies the mode transition trigger preparation condition.

Alternatively, when receiving the system information corresponding to the candidate coverage category, the UE may continue to determine whether the signal quality of the serving cell satisfies the mode transition trigger preparation condition. Based on the determination result indicating that the signal quality no longer satisfies the mode transition trigger preparation condition, the UE may not interrupt system information being received currently, in other words, the UE may complete receiving the system information being received currently.

Alternatively, when the UE receives the system information corresponding to the candidate coverage category, the UE may continue to determine whether the signal quality of the serving cell satisfies the mode transition trigger preparation condition. Based on the determination result indicating that the signal quality no longer satisfies the mode transition trigger preparation condition, the UE may immediately interrupt the system information being received currently and enter a sleep preparation state, in other words, the UE may stop receiving the system information being received currently, and enter an idle state workflow.

Further, when the UE receives a paging message and identifies that the UE will transition from the idle state to a connected state, the UE may stop determining whether the signal quality of the serving cell satisfies the mode transition trigger preparation condition.

Further, the UE may immediately enter a sleep preparation state to resume an idle state workflow after successfully receiving the system information that needs to be received.

In some embodiments, the serving cell is in a regular coverage mode, and the signal quality of the serving cell satisfying the mode transition trigger preparation condition includes: Srxlev≤N, Squal≤N and this lasting for a duration T, T=PagingCycle×M, where N is a positive integer greater than 1, M is a positive integer greater than 1, Srxlev represents a cell selection reception category factor in dB, Squal represents a cell selection quality factor in dB, Srxlev and Squal are calculated based on the signal quality, T represents the duration, and PagingCycle represents a paging cycle. For example, N is selected from a set {3, 4, 5, 6}, and M is selected from a set {3, 4, 5}.

In some embodiments, the serving cell is in a regular coverage mode, and the signal quality of the serving cell satisfying the mode transition trigger preparation condition includes: RS_SINR≤Th and this lasting for a duration T, T=PagingCycle×M, where Th is a negative integer, M is a positive integer greater than 1, RS_SINR represents a reference signal SINR in dB, and PagingCycle represents a paging cycle. For example, Th is selected from a set {−3, −4, −5, −6}, and M is selected from a set {3, 4, 5}.

In some embodiments, the serving cell is in a regular coverage mode, and the signal quality of the serving cell satisfying the mode transition trigger preparation condition includes: Srxlev≤N, Squal≤N, RS_SINR≤Th and this lasting for a duration T, T=PagingCycle×M, where N is a positive integer greater than 1, Th is a negative integer, M is a positive integer greater than 1, Srxlev represents a cell selection reception category factor in dB, Squal represents a cell selection quality factor in dB, Srxlev and Squal are both calculated based on the signal quality, RS_SINR represents a reference signal SINR in dB, T represents the duration, and PagingCycle represents a paging cycle. For example, N is selected from a set {3, 4, 5, 6}, Th is selected from a set {−3, −4, −5, −6}, and M is selected from a set {3, 4, 5}.

In some embodiments, if the UE is in the enhanced coverage mode, the signal quality of the serving cell satisfies the mode transition trigger preparation condition, the UE does not have any better cell reselection event, and the cell reselection event is not started, the UE may receive the system information that needs to be received, wherein the system information that needs to be received refers to system information required by the regular coverage mode. Alternatively, if the UE is in the regular coverage mode, the signal quality of the serving cell satisfies the mode transition trigger preparation condition, the UE does not have any better cell reselection event, and the cell reselection event is not started, the UE may receive the system information that needs to be received, wherein the system information that needs to be received refers to system information required by the enhanced coverage mode.

In some embodiments, the serving cell is in an enhanced coverage mode, and the signal quality of the serving cell satisfying the mode transition trigger preparation condition includes: Srxlev≥N, Squal≥N and this lasting for a duration T, T=PagingCycle×M, where N is a negative integer, M is a positive integer greater than 1, Srxlev represents a cell selection reception category factor in dB, Squal represents a cell selection quality factor in dB, Srxlev and Squal are both calculated based on the signal quality, Q_rxlevmin and Q_qualmin, T represents the duration, PagingCycle represents a paging cycle, Q_rxlevmin represents a minimum required reception level in the cell, and Q_qualmin represents a minimum required quality level in the cell. For example, N is selected from a set {−3, −4, −5, −6}, and M is selected from a set {3, 4, 5}.

In some embodiments, the serving cell is in an enhanced coverage mode, and the signal quality of the serving cell satisfying the mode transition trigger preparation condition includes: RS_SINR≥Th and this lasting for a duration T, T=PagingCycle×M, where Th is a negative integer, M is a positive integer greater than 1, RS_SINR represents a reference signal SINR in dB, and PagingCycle represents a paging cycle. For example, Th is selected from a set {−3, −4, −5, −6}, and M is selected from a set {3, 4, 5}.

In some embodiments, the serving cell is in an enhanced coverage mode, and the signal quality of the serving cell satisfying the mode transition trigger preparation condition includes: Srxlev≥N, Squal≥N, RS_SINR≥Th and this lasting for a duration T, T=PagingCycle×M, where N is a negative integer, Th is a negative integer, Srxlev represents a cell selection reception category factor in dB, Squal represents a cell selection quality factor in dB, Srxlev and Squal are both calculated based on the signal quality, Q_rxlevmin and Q_qualmin, T represents the duration, PagingCycle represents a paging cycle, M is a positive integer greater than 1, Q_rxlevmin represents a minimum required reception category factor of the cell, Q_qualmin represents a minimum required quality factor of the cell, and RS SINR represents a reference signal SINR in dB. For example, N is selected from a set {−3, −4, −5, −6}, Th is selected from a set {−3, −4, −5, −6}, and M is selected from a set {3, 4, 5}.

Further, after the UE receives the system information that needs to be received, the UE may determine whether the signal quality of the serving cell satisfies the mode transition trigger condition. Based on the signal quality of the serving cell satisfying the mode transition trigger condition, the UE may perform coverage mode transition. In some embodiments, the coverage mode transition may be a transition from the regular coverage mode to the enhanced coverage mode, or a transition from the enhanced coverage mode to the normal coverage mode.

In some embodiments, the serving cell is in the regular coverage mode, and the signal quality of the serving cell satisfies the mode transition trigger condition may refer to that S criterion satisfies the serving cell unavailability condition. The S criterion satisfying the unavailability condition of the serving cell includes either Srxlev or Squal being smaller than 0, where the S criterion in the regular coverage mode may be referred to 3GPP TS36.304 standard.

In some embodiments, the signal quality of the serving cell satisfying the mode transition trigger preparation condition includes a reference signal SINR of the serving cell satisfying a following condition: RS_SINR<Th1 and this lasting for a duration T1, T1=PagingCycle×Q, where RS_SINR represents the reference signal SINR, T1 represents the duration, and Th1 is a negative integer. For example, Th1 is selected from a set {−5, −6, −7, −8}, and Q is selected from a set {3, 4, 5}.

In some embodiments, the signal quality of the serving cell satisfying the mode transition trigger preparation condition includes: the S criterion satisfying the serving cell unavailability condition, and the reference signal SINR of the serving cell satisfying a following condition: RS_SINR<Th1 and this lasting for a duration T1, T1=PagingCycle×Q, where RS_SINR represents the reference signal SINR, T1 represents the duration, and Th1 is a negative integer. For example, Th1 is selected from a set {−5, −6, −7, −8}, and Q is selected from a set {3, 4, 5}.

In some embodiments, the serving cell is in an enhanced coverage mode, and the signal quality of the serving cell satisfying the mode transition trigger preparation condition includes S criterion satisfying a regular coverage condition of the serving cell, where the S criterion in the regular coverage mode may be referred to 3GPP TS36.304 standard.

In some embodiments, the signal quality of the serving cell satisfying the mode transition trigger preparation condition includes an SINR of a reference signal of the serving cell satisfying a following condition: RS_SINR>Th2 and this lasting for a duration T1, T1=PagingCycle×Q, where T1 represents a duration of RS_SINR>Th2, PagingCycle represents a paging cycle, RS_SINR represents a reference signal SINR, and Th2 is a negative integer. For example, Th2 is selected from a set {−6, −5, −4, −3}, and Q is selected from a set {3, 4, 5}.

In some embodiments, the signal quality of the serving cell satisfying the mode transition trigger preparation condition includes: the S criterion satisfying a serving cell unavailability condition, and the SINR of the reference signal of the serving cell satisfying a following condition: RS_SINR>Th2 and this lasting for a duration T1, where RS_SINR represents the SINR of the reference signal, T1 represents a duration of RS_SINR>Th2, T1=PagingCycle× Q, PagingCycle represents a paging cycle, and Th2 is a negative integer. For example, Th2 is selected from a set {−6, −5, −4, −3}, and Q is selected from a set {3, 4, 5}.

More details are provided with specific embodiments as follows.

In the below embodiment, the UE is in the regular coverage mode.

First, the UE camps on a network to read a MIB, and determines whether a filed schedulingInfoSIB1-BR-r13 in the MIB is not all zero. If not, the serving cell where the UE is currently camping on does not support CE. It should be noted that according to 3GPP TS36.213/36.331, the field schedulingInfoSIB1-BR-r13 is not all 0, which indicates that a current network to be camped on supports CE. The UE may continue to read regular SIB1 information, and determine whether the S criterion for regular coverage is satisfied based on Q_rxlevmin and Q_qualmin information in SIB1 information. If the S criterion is not satisfied, the UE may jump to the enhanced coverage mode to camp on the network.

Secondly, when the UE supports coverage enhancement and regular coverage, the UE may try to camp on the network in the regular coverage mode, perform regular idle state tasks and monitor a measurement parameter of the serving cell.

The serving cell measurement parameter may include, but is not limited to, RSRP, RSRQ and RS-SINR.

Thirdly, if the measurement parameter of the serving cell does not meet the mode transition trigger preparation condition, the UE in the idle state may maintain a normal idle state workflow to perform tasks such as monitoring paging and cell reselection evaluation, where normal task sequences such as idle state sleep, wake-up, synchronization resumption, paging monitoring, and measurement are included.

Figure 2:
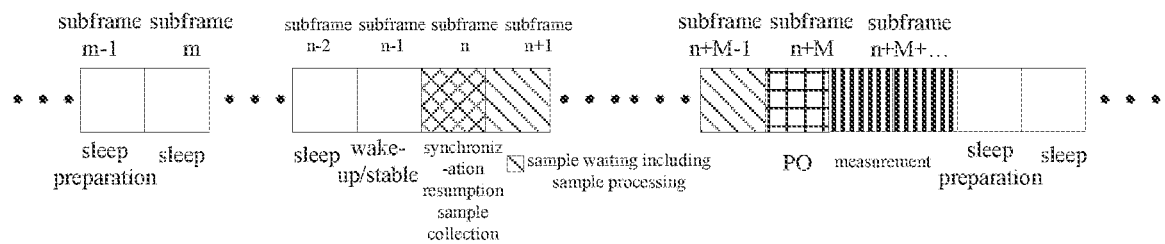
FIG. 2 is a diagram of an idle-state workflow of a UE in an idle-state according to an embodiment.

FIG. 2 is a diagram of an idle state workflow of a UE in an idle state according to an embodiment. Referring to FIG. 2, when the UE is in the idle state, the UE enters sleep preparation at a certain time, and then enters a sleep state and holds for a time period. In FIG. 2, the UE performs sleep preparation in a subframe (m−1), and is in the sleep state during a period from a subframe m to a subframe (n−2). Afterward, the UE may wake up or tend to be stable in a subframe (n−1). Further, the UE performs synchronization resumption sample collection in a subframe n, and performs sample waiting and sample processing from a subframe (n+1) to a subframe (n+M−1). Further, a subframe (n+M) is a paging occasion (PO). The UE receives paging, and then performs measurement. After the measurement, the UE continues to enter the sleep preparation state and the sleep state.

In some embodiments, if the measurement parameter of the serving cell satisfies the mode transition trigger preparation condition and no better cell reselection event occurs, the UE may start a mode transition system information pre-reading procedure to obtain SIB1-BR and other SIBs of the current cell. A judging process of absence of any preferred cell reselection event can be referred to existing methods, for example, chapter 5.2.4 of 3GPP TS 36.304 standard, which is not described in detail here.

In some embodiments, the serving cell measurement parameter satisfying the mode transition trigger preparation condition includes: Srxlev≤N, Squal≤N and this lasting for a duration T, where these parameters are obtained according to RSRP/RSRQ, a value range of N is {3, 4, 5, 6}, T=PagingCycle×M, and M can be selected from a set {3,4,5}.

In some embodiments, the serving cell measurement parameter satisfying the mode transition trigger preparation condition includes: RS_SINR≤Th and this lasting for a duration T, where a value range of Th is {−3, −4, −5, −6} in dB, T=PagingCycle×M, a value range of M is {3, 4, 5}, and RS_SINR represents an RS-SINR of the serving cell.

In some embodiments, the serving cell measurement parameter satisfying the mode transition trigger preparation condition includes: Srxlev≤N, Squal≤N, RS_SINR≤Th and this lasting for a duration T, where these parameters are obtained according to RSRP/RSRQ, a value range of N is {3, 4, 5, 6}, a value range of Th is {−3, −4, −5, −6} dB, T=PagingCycle×M, a value range of M is {3, 4, 5}, and RS_SINR represents an RS-SINR of the serving cell.

In some embodiments, the mode transition system information pre-reading process may further include following steps.

In step A, the UE maintains a normal idle state workflow to perform tasks such as monitoring paging and cell reselection evaluation, where normal task sequences such as idle state sleep, wake-up, synchronization resumption, paging monitoring, and measurement are included. Details of step A can be referred to patent application No. CN201810972554.6, which is titled "SLEEP AND WAKE-UP SYNCHRONOUS RESUMPTION METHOD AND DEVICE FOR TERMINAL", which are not repeated here.

Figure 3:
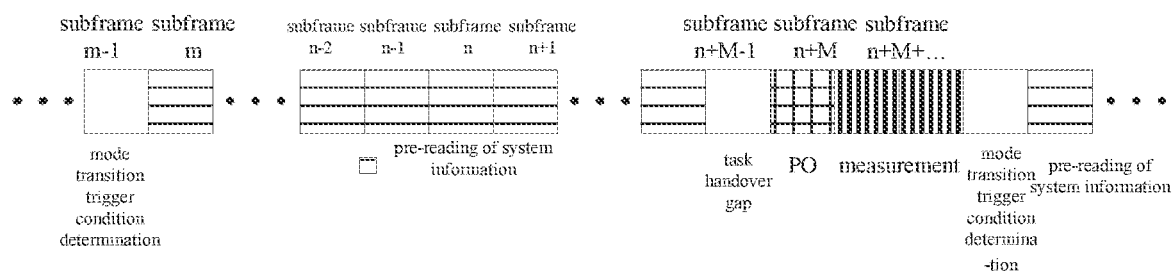
FIG. 3 is an application scenario diagram of a signal reception method for a UE in an idle-state according to an embodiment.

In step B, based on the mode transition trigger preparation condition being satisfied, a workflow of the UE can be referred to FIG. 3. A difference from FIG. 2 lies in that original "sleep preparation" task and "sleep" task can be replaced by reading SIB1-BR and other SIB information of the serving cell after a last wake-up task cycle ends, until the normal idle state task is resumed after the reading is all completed.

FIG. 3 is an application scenario diagram of a signal reception method for a UE in an idle-state according to an embodiment. Referring to FIG. 3, a subframe (m−1) used for executing the sleep preparation task is used for determining the mode transition trigger condition, and the subframe used for executing the sleep task can be used for pre-reading system information, that is, receiving system information. In a previous subframe of a PO subframe (such as a subframe (n+M−1) in the figure), task handover may be performed, and this subframe can be used as a task handover gap. Further, after the UE completes the measurement, the mode transition trigger condition may be determined, and the system information pre-reading may be continued. Those skilled in the art could understand that a duration of the system information pre-reading may be shorter than a UE sleep duration specified in existing standards. In this case, the UE may enter the sleep preparation and the sleep state after completing the system information pre-reading.

In step B, the mode transition trigger preparation condition determination process may be adjacent to an end time point of the wake-up task (including synchronization resumption, paging monitoring and measurement) in the regular idle state task sequence, which is used for periodically determining whether the mode transition trigger preparation condition is satisfied.

In some embodiments, when the system information pre-reading has been started and has not ended, the mode transition trigger preparation condition determination process is no longer performed.

In some embodiments, when the system information pre-reading has been started and has not ended, the mode transition trigger preparation condition determination process continues to be performed, but even if the periodic determination finds that the mode transition trigger preparation condition is no longer satisfied, the pre-reading of system information that has been started will not be interrupted.

In some embodiments, when the pre-reading of system information has been started and has not ended, the mode transition trigger preparation condition determination process continues to be performed. If the periodic determination finds that the mode transition trigger preparation condition is no longer satisfied, the already activated pre-reading of system information is interrupted immediately, and the normal idle state workflow is resumed.

In some embodiments, after the pre-reading of the system information is completed, the normal idle state workflow is immediately resumed.

In some embodiments, when the paging monitoring identifies that the terminal needs to transition to the connected state, all the above steps are interrupted.

Further, after the UE obtains complete system information for enhanced coverage, if the signal quality of the serving cell satisfies the mode transition trigger condition, the mode transition is triggered so as to use the enhanced coverage mode to camp on a network.

In some embodiments, the mode transition is triggered when the S criterion satisfies the serving cell unavailability condition.

In some embodiments, when $RS\_SINR<Th1$ and this lasts for a duration T1, mode transition is triggered. A value range of Th1 is $\{-5, -6, -7, -8\}$ in dB, T1=PagingCycle×Q, a value range of Q is $\{3, 4, 5\}$, and RS_SINR represents the RS_SINR of the serving cell.

In some embodiments, when the S criterion satisfies the serving cell unavailability condition, $RS\_SINR<Th1$ and this lasts for a duration T1, the mode transition is triggered, a value range of Th1 is $\{-5, -6, -7, -8\}$ in dB, T1=PagingCycle×Q, a value range of Q is $\{3, 4, 5\}$, and RS_SINR represents the RS-SINR of the serving cell.

In the below embodiment, the UE is in the enhanced coverage mode.

First, after the UE reads MIB, the UE may continue to read SIB1-BR message of enhanced coverage, and determine whether the S criterion for enhanced coverage is satisfied based on Q_rxlevminCE/Q_rxlevminCE1 and Q_qualminCE/Q_qualminCE1 information in the SIB1-BR message. If it is not satisfied, it indicates that the current cell is unavailable, and the UE will jump to a network search process. Otherwise, the UE may camp on a network in the enhanced coverage mode, perform normal idle state tasks, and monitor a measurement parameter of the serving cell in real time.

The serving cell measurement parameter may include, but is not limited to, RSRP, RSRQ and RS-SINR.

Secondly, if the measurement parameter of the serving cell satisfies the mode transition trigger preparation condition and no better cell reselection event occurs, the UE may start a mode transition system information pre-reading procedure to obtain SIB1-BR and other SIBs of the current cell.

In some embodiments, the serving cell measurement parameter satisfying the mode transition trigger preparation condition includes: $Srxlev \geq N$, $Squal \geq N$ and this lasting for a duration T, where these parameters are obtained according to RSRP/RSRQ, Q_rxlevmin and Q_qualmin, a value range of N is $\{-6, -5, -4, -3\}$, T=PagingCycle×M, a value range of M is $\{3,4,5\}$, Q_rxlevmin represents a minimum required reception level in the cell, and Q_qualmin represents a minimum required quality level in the cell.

In some embodiments, the serving cell measurement parameter satisfying the mode transition trigger preparation condition includes: $RS\_SINR \geq Th$ and this lasting for a duration T, where a value range of Th is $\{-6, -5, -4, -3\}$ in dB, T=PagingCycle×M, a value range of M is $\{3, 4, 5\}$, and RS SINR represents an RS-SINR of the serving cell.

In some embodiments, the serving cell measurement parameter satisfying the mode transition trigger preparation condition includes: $Srxlev \geq N$, $Squal \geq N$, $RS\_SINR \geq Th$ and this lasting for a duration T, where these parameters are obtained according to RSRP/RSRQ, Q_rxlevmin and Q_qualmin, a value range of N is $\{-6, -5, -4, -3\}$ dB, a value range of Th is $\{-6, -5, -4, -3\}$ dB, T=PagingCycle× M, a value range of M is $\{3,4,5\}$, RS_SINR represents an RS-SINR of the serving cell, Q_rxlevmin represents a minimum required reception level in the cell, and Q_qualmin represents a minimum required quality level in the cell.

In some embodiments, the mode transition system information pre-reading process may further include following steps.

In step A1, the UE maintains a normal idle state workflow to perform tasks which is similar as FIG. 2 and not described in detail here. Details of step A can be referred to patent application No. CN201810972554.6, which is titled "SLEEP AND WAKE-UP SYNCHRONOUS RESUMPTION METHOD AND DEVICE FOR TERMINAL".

In step B1, based on the mode transition trigger preparation condition being satisfied, original "sleep preparation" task and "sleep" task are replaced by reading SIB1-BR and other SIB information of the serving cell after a last wake-up task cycle ends, until the normal idle state task is resumed after the reading is all completed.

Further, after the UE obtains complete system information for regular coverage, the mode transition is triggered so as to use the regular coverage mode to camp on a network.

In some embodiments, the mode transition is triggered when the S criterion satisfies the serving cell regular coverage condition.

In some embodiments, when RS_SINR>Th2 and this lasts for a duration T1, mode transition is triggered. A value range of Th2 is {−3,−4,−5,−6} in dB, T1=PagingCycle×Q, a value range of Q is {3, 4, 5}, and RS_SINR represents the RS-SINR of the serving cell.

In some embodiments, when the S criterion satisfies the serving cell regular coverage condition, RS_SINR>Th2 and this lasts for a duration T1, the mode transition is triggered, a value range of Th2 is {−6,−5,−4,−3} in dB, T1=PagingCycle×Q, a value range of Q is {3, 4, 5}, and RS_SINR represents the RS-SINR of the serving cell.

From above, the embodiments of the present disclosure enable] the UE supporting enhanced coverage to achieve optimal mobility experience in an idle state. The present disclosure is especially suitable for operator deployment environment in which LTE coverage enhancement technology is widely used for the whole network deployment. Generally, compared with existing methods, the larger the operator deployment environment the LTE coverage enhancement technology adopts, the better the idle state mobility experience can be provided for users.

Figure 4:
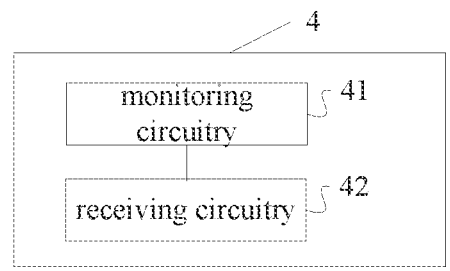
FIG. 4 is a structural diagram of a signal reception apparatus for a UE in an idle-state according to an embodiment.

FIG. 4 is a structural diagram of a signal reception apparatus for a UE in an idle-state according to an embodiment. The signal reception apparatus 4 for the UE in the idle-state may be applied to a terminal, such as a UE.

In some embodiments, the signal reception apparatus 4 includes: a monitoring circuitry 41 configured to monitor signal quality of a serving cell; and a receiving circuitry 42 configured to determine and receive system information matching the signal quality based on the signal quality.

Working principles and modes of the signal reception apparatus 4 may be referred to the above descriptions of FIG. 1, and are not described in detail here.

In an embodiment of the present disclosure, a storage medium having computer instructions stored therein is provided, wherein when the computer instructions are executed, the above method as shown in FIG. 1 is performed. In some embodiments, the storage medium may be a computer readable storage medium, and may include a non-volatile or a non-transitory memory, or include a ROM, a RAM, a magnetic disk or an optical disk.

In an embodiment of the present disclosure, a terminal including a memory and a processor is provided, wherein the memory has computer instructions stored therein, and when the processor executes the computer instructions, the above method as shown in FIG. 1 is performed. In some embodiments, the terminal may be a UE.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A signal reception method for a User Equipment (UE) in an idle-state, comprising:
    monitoring signal quality of a serving cell; and
    determining and receiving system information matching the signal quality based on the signal quality;
    wherein said determining and receiving system information matching the signal quality based on the signal quality comprises:
    determining a mode transition trigger preparation condition that the signal quality satisfies, wherein the mode transition trigger preparation condition corresponds to a candidate coverage category;
    determining the candidate coverage category and system information corresponding to the candidate coverage category based on the mode transition trigger preparation condition; and
    receiving the system information corresponding to the candidate coverage category.

2. The method according to claim 1, wherein said receiving the system information corresponding to the candidate coverage category comprises:
    based on the mode transition trigger preparation condition being satisfied, receiving the system information corresponding to the candidate coverage category after paging monitoring and measurement are performed.

3. The method according to claim 2, wherein said receiving the system information corresponding to the candidate coverage category further comprises:
    stopping determining whether the signal quality of the serving cell satisfies the mode transition trigger preparation condition during reception of the system information corresponding to the candidate coverage category.

4. The method according to claim 2, wherein said receiving the system information corresponding to the candidate coverage category further comprises:
    continuing to determine whether the signal quality of the serving cell satisfies the mode transition trigger preparation condition during reception of the system information corresponding to the candidate coverage category; and
    based on the signal quality no longer meeting the mode transition trigger preparation condition, not interrupting the system information currently being received, or interrupting the system information currently being received immediately and entering a sleep preparation state.

5. The method according to claim 2, wherein said receiving the system information corresponding to the candidate coverage category further comprises:
    based on the paging monitoring identifying that the UE will transition from the idle state to a connected state, stopping determining whether the signal quality of the serving cell satisfies the mode transition trigger preparation condition.

6. The method according to claim 1, wherein said receiving the system information corresponding to the candidate coverage category further comprises:
    immediately entering a sleep preparation state to resume an idle state workflow after successfully receiving the system information.

7. The method according to claim 1, wherein the serving cell is in a regular coverage mode, and the signal quality of the serving cell satisfying the mode transition trigger preparation condition comprises:
    Srxlev≤N, Squal≤N and this lasting for a duration T, T=PagingCycle×M,
    where N is a positive integer greater than 1, M is a positive integer greater than 1, Srxlev represents a cell selection reception category factor in dB, Squal represents a cell selection quality factor in dB, Srxlev and Squal are calculated based on the signal quality, T represents the duration, and PagingCycle represents a paging cycle.

8. The method according to claim 1, wherein the serving cell is in a regular coverage mode, and the signal quality of the serving cell satisfying the mode transition trigger preparation condition comprises:

RS_SINR≤Th and this lasting for a duration T, T=PagingCycle×M, where Th is a negative integer, M is a positive integer greater than 1, RS_SINR represents a reference signal Signal to Interference plus Noise Ratio (SINR) in dB, and PagingCycle represents a paging cycle.

9. The method according to claim 1, wherein the serving cell is in a regular coverage mode, and the signal quality of the serving cell satisfying the mode transition trigger preparation condition comprises:

Srxlev≤N, Squal≤N, RS_SINR≤Th and this lasting for a duration T, T=PagingCycle×M, where N is a positive integer greater than 1, Th is a negative integer, M is a positive integer greater than 1, Srxlev represents a cell selection reception category factor in dB, Squal represents a cell selection quality factor in dB, Srxlev and Squal are both calculated based on the signal quality, RS_SINR represents a reference signal SINR in dB, T represents the duration, and PagingCycle represents a paging cycle.

10. The method according to claim 1, further comprising:

determining whether the signal quality of the serving cell satisfies mode transition trigger preparation condition; and based on the signal quality of the serving cell satisfying the mode transition trigger preparation condition, performing coverage mode transition, wherein the coverage mode transition comprises a transition from a regular coverage mode to an enhanced coverage mode, or a transition from the enhanced coverage mode to the regular coverage mode.

11. The method according to claim 10, wherein the serving cell is in the regular coverage mode, and the signal quality of the serving cell satisfying the mode transition trigger preparation condition comprises:

S criterion satisfying a serving cell unavailability condition; or a reference signal SINR of the serving cell satisfying a following condition: RS SINR<Th1 and this lasting for a duration T1, T1=PagingCycle×Q, where RS_SINR represents the reference signal SINR, T1 represents the duration, and Th1 is a negative integer; or, the S criterion satisfying the serving cell unavailability condition, and the reference signal SINR of the serving cell satisfying a following condition: RS_SINR<Th1 and this lasting for a duration T1, T1=PagingCycle×Q, where RS_SINR represents the reference signal SINR, T1 represents the duration, and Th1 is a negative integer.

12. The method according to claim 10, wherein the serving cell is in an enhanced coverage mode, and the signal quality of the serving cell satisfying the mode transition trigger preparation condition comprises:

S criterion satisfying a regular coverage condition of the serving cell; or an SINR of a reference signal of the serving cell satisfying a following condition:

RS_SINR>Th2 and this lasting for a duration T1, T1=PagingCycle×Q, where T1 represents a duration of RS_SINR>Th2, PagingCycle represents a paging cycle, RS_SINR represents a reference signal SINR, and Th2 is a negative integer; or the S criterion satisfying a serving cell unavailability condition, and the SINR of the reference signal of the serving cell satisfying a following condition: RS_SINR>Th2 and this lasting for a duration T1, where RS_SINR represents the SINR of the reference signal, T1 represents a duration of RS_SINR>Th2, T1=PagingCycle×Q, PagingCycle represents a paging cycle, and Th2 is a negative integer.

13. The method according to claim 1, wherein said receiving the system information corresponding to the candidate coverage category comprises:

based on the signal quality of the serving cell satisfying the mode transition trigger preparation condition and a cell reselection event being not started, receiving the system information corresponding to the candidate coverage category.

14. The method according to claim 1, wherein the serving cell is in an enhanced coverage mode, and the signal quality of the serving cell satisfying the mode transition trigger preparation condition comprises:

Srxlev≥N, Squal≥N and this lasting for a duration T, T=PagingCycle×M, where N is a negative integer, M is a positive integer greater than 1, Srxlev represents a cell selection reception category factor in dB, Squal represents a cell selection quality factor in dB, Srxlev and Squal are both calculated based on the signal quality, Q_rxlevmin and Q_qualmin, T represents the duration, PagingCycle represents a paging cycle, Q_rxlevmin represents a minimum required reception level in the cell, and Q_qualmin represents a minimum required quality level in the cell.

15. The method according to claim 1, wherein the serving cell is in an enhanced coverage mode, and the signal quality of the serving cell satisfying the mode transition trigger preparation condition comprises:

RS_SINR≥ Th and this lasting for a duration T, T=PagingCycle×M, where Th is a negative integer, M is a positive integer greater than 1, RS_SINR represents a reference signal SINR in dB, and PagingCycle represents a paging cycle.

16. The method according to claim 1, wherein the serving cell is in an enhanced coverage mode, and the signal quality of the serving cell satisfying the mode transition trigger preparation condition comprises:

Srxlev≥N, Squal≥N, RS_SINR≥Th and this lasting for a duration T, T=PagingCycle×M, where N is a negative integer, Th is a negative integer, Srxlev represents a cell selection reception category factor in dB, Squal represents a cell selection quality factor in dB, Srxlev and Squal are both calculated based on the signal quality, Q_rxlevmin and Q_qualmin, T represents the duration, PagingCycle represents a paging cycle, M is a positive integer greater than 1, Q_rxlevmin represents a minimum required reception level in the cell, Q_qualmin represents a minimum required quality level in the cell, and RS_SINR represents a reference signal SINR in dB.

17. The method according to claim 1, wherein the serving cell is in a regular coverage mode, and prior to determining and receiving system information matching the signal quality, the method further comprises:

determining whether the serving cell supports an enhanced coverage mode, so that receiving the system information matching the signal quality based on the serving cell supporting the enhanced coverage mode.

18. A non-transitory storage medium storing one or more programs, the one or more programs comprising computer instructions, which, when executed by a processor, cause the processor to:
monitor signal quality of a serving cell; and
determine and receive system information matching the signal quality based on the signal quality:
wherein the processor is further caused to:
determine a mode transition trigger preparation condition that the signal quality satisfies, wherein the mode transition trigger preparation condition corresponds to a candidate coverage category;
determine the candidate coverage category and system information corresponding to the candidate coverage category based on the mode transition trigger preparation condition; and
receive the system information corresponding to the candidate coverage category.

19. A terminal comprising a memory and a processor, wherein the memory stores one or more programs, the one or more programs comprising computer instructions, which, when executed by the processor, cause the processor to:
monitor signal quality of a serving cell; and
determine and receive system information matching the signal quality based on the signal quality:
wherein the processor is further caused to:
determine a mode transition trigger preparation condition that the signal quality satisfies, wherein the mode transition trigger preparation condition corresponds to a candidate coverage category;
determine the candidate coverage category and system information corresponding to the candidate coverage category based on the mode transition trigger preparation condition; and
receive the system information corresponding to the candidate coverage category.

* * * * *